(12) United States Patent
Zhang et al.

(10) Patent No.: US 7,551,646 B1
(45) Date of Patent: Jun. 23, 2009

(54) DATA ALIGNMENT AND DESKEWING MODULE

(75) Inventors: Qi Zhang, Milpitas, CA (US); Jason R. Bergendahl, Sunnyvale, CA (US); Atul V. Ghia, San Jose, CA (US); Suresh M. Menon, Sunnyvale, CA (US)

(73) Assignee: XILINX, Inc., San Jose, CA (US)

( * ) Notice: Subject to any disclaimer, the term of this patent is extended or adjusted under 35 U.S.C. 154(b) by 1006 days.

(21) Appl. No.: 10/938,151

(22) Filed: Sep. 10, 2004

(51) Int. Cl.
*H04J 3/06* (2006.01)
(52) U.S. Cl. .................. 370/503; 370/516; 375/376
(58) Field of Classification Search ......... 370/503–520; 327/5; 713/401
See application file for complete search history.

(56) References Cited

U.S. PATENT DOCUMENTS 6,760,803 B1 *  7/2004  Gauvin et al. ............... 710/305
6,834,255 B2 * 12/2004  Abrosimov et al. ......... 702/181
7,161,391 B2 *  1/2007  Lin .............................. 327/3

* cited by examiner

*Primary Examiner*—Phuc H Tran
(74) *Attorney, Agent, or Firm*—Timothy W. Markison; Thomas Goerge

(57) ABSTRACT

A data alignment and deskewing module includes a delay calibration unit, a data alignment and deskew unit, and a delay unit. The delay calibration unit is operably coupled to generate a reference signal based on a reference clock and a mirrored delay line output signal. The data alignment and deskew unit is operably coupled to determine a delay selection signal based on a delayed and deskewed representation of an input data stream and propagation delay of a line on which the input data stream is received. The delay unit is operably coupled to produce the delayed and deskewed representation of the input data stream based on the reference signal and the delay selection signal.

31 Claims, 8 Drawing Sheets data alignment & deskew modules 44-50 continuous interface 20-22
prior art data alignment & deskew module 44-50 data alignment & deskew modules 44-50 delay calibration unit 60 delay unit 64 apparatus 110 for aligning & deskewing an input data stream

DATA ALIGNMENT AND DESKEWING MODULE

BACKGROUND OF THE INVENTION

1. Technical Field of the Invention

This invention relates generally to data communications and more particularly to aligning and/or deskewing high-speed data and/or clock signals.

2. Description of Related Art

Communication systems are known to transport large amounts of data between a plurality of end user devices, which, for example, include telephones, facsimile machines, computers, television sets, cellular telephones, personal digital assistants, etc. As is also known, such communication systems may be local area networks (LANs) and/or wide area networks (WANs) that are stand-alone communication systems or interconnected to other LANs and/or WANs as part of a public switched telephone network (PSTN), packet switched data network (PSDN), integrated service digital network (ISDN), the Internet, etc. As is further known, communication systems include a plurality of system equipment to facilitate the transporting of data. Such system equipment includes, but is not limited to, routers, switches, bridges, gateways, protocol converters, frame relays, private branch exchanges, etc.

The transportation of data within communication systems is typically governed by one or more standards that ensure the integrity of data conveyances and fairness of access for data conveyances. For example, there are a variety of Ethernet standards that govern serial transmissions within a communication system at data rates of 10 megabits per second, 100 megabits per second, 1 gigabit per second and beyond. Another standard, which is for fiber optic data conveyances, is Synchronous Optical NETwork (SONET) that provides a data rate of 10 gigabits per second. In accordance with such standards, many system equipment components and end user devices of a communication system transport data via serial transmission paths. Internally, however, the system equipment components and end user devices process data in a parallel manner. As such, each system equipment component and end user device must receive the serial data and convert the serial data into parallel data without loss of information.

FIG. 1 is a schematic block diagram of integrated circuits that may be included in a system equipment component and/or in an end user device. As shown, a Field Programmable Gate Array (FPGA) 10 is coupled to a memory chip 12 and to a network chip 14. As is further shown, the connection between the FPGA 10 and the memory chip 12 includes a plurality of discontinuous parallel serial data streams and the connection between the connection between the FPGA 10 and the network chip 14 includes a plurality of parallel continuous serial data streams. As is known, the parallel serial data streams are used to increase data rates while maintaining compliance with serial transmission standards.

To process receiving of the plurality of discontinuous serial data streams, the FPGA 10 includes a plurality of discontinuous interfaces 16 and 18, and a plurality of continuous interfaces 20 and 22. In some embodiments, FPGA 10 may optionally include a plurality of serial to parallel modules 17A and B, and 21A and B (shown in dotted boxes in the figure). The discontinuous interfaces 16 and 18 each receive one of the plurality of discontinuous serial data streams and synchronizes the serial data stream to a local clock of the FPGA 10 and aligns the synchronized serial data stream with the synchronized serial data streams produced by the other discontinuous interfaces. The optional serial to parallel modules 17A and B convert the aligned and synchronized serial data streams into parallel data in accordance with the standard, or standards, to which the device is compliant.

The continuous interfaces 20 and 22 perform a similar function as discontinuous interfaces 16 and 18, but for the continuous data from the network chip 16. As such, the continuous interfaces 20 and 22 align and synchronize the continuous parallel serial data streams, which may then be converted into parallel data by the optional serial to parallel modules 21A and B. Due to the different nature of the continuous serial data streams and the discontinuous data streams, the continuous interfaces 20 and 22 cannot reliably be used for the discontinuous interfaces 16 and 18.

FIG. 2 is a schematic block diagram of a continuous interface 20 or 22 that includes a clock recovery module 26, a retiming unit 24, and a resynchronization unit 28. The clock recovery module 26 receives an incoming serial data stream, which is at a rate equal to the local clock or a fraction thereof, and re-aligns it based on the local clock to produce a recovered clock F2. The retiming unit 24 retimes the incoming data based on the recovered clock F2 to produce retimed data. The resynchronization unit 28 synchronizes the retimed data with the local clock to produce aligned and synced data.

While the continuous interface 20 or 22 works well for aligning and synchronizing continuous data streams, it does not reliably align and synchronize discontinuous data streams due to one or more of: a lack of a local reference clock (e.g., memory devices transmit a non-continuous strobe with the data), lack of continuous data, a requirement for a resynchronization block, and lack of programmability of the clock recovery module.

To increase the flexibility of use of an FPGA, or any other device that receives continuous and discontinuous data streams, it is desirable to have one interface that accurately aligns and deskews (or synchronizes) both continuous and discontinuous data streams.

Therefore, a need exists for a data alignment and deskewing module that accurately aligns and deskews (or synchronizes) both continuous and discontinuous data streams.

BRIEF SUMMARY OF THE INVENTION

A data alignment and deskewing module of the present invention substantially meets these needs and others. In one embodiment, a data alignment and deskewing module includes a delay calibration unit, a data alignment and deskew unit, and a delay unit. The delay calibration unit is operably coupled to generate a reference signal based on a reference clock and a mirrored delay line output signal. The data alignment and deskew unit is operably coupled to determine a delay selection signal based on a delayed and deskewed representation of an input data stream and propagation delay of a line on which the input data stream is received. The delay unit is operably coupled to produce the delayed and deskewed representation of the input data stream based on the reference signal and the delay selection signal.

In another embodiment, apparatus for aligning and deskewing an input data stream, the apparatus includes means for setting, means for determining, and means for producing. The means for setting sets a control signal based on a reference clock and a reference controlled delay line. The means for determining determines a delay selection signal based on propagation delay of a line on which the input data stream is received. The means for producing produces a delayed and deskewed representation of the input data stream based on at least one of the control signal and the delay selection signal. In some embodiments the means for producing includes second means for producing and means for selecting. The second means for producing produces a plurality of delayed representations of the input data stream based on the control signal. The means for selecting selects one of the plurality of delayed representations of the input data stream based on the delay selection signal to produce an aligned and deskewed representation of the input data stream.

BRIEF DESCRIPTION OF THE SEVERAL
VIEWS OF THE DRAWINGS

DETAILED DESCRIPTION OF THE INVENTION

Figure 3:
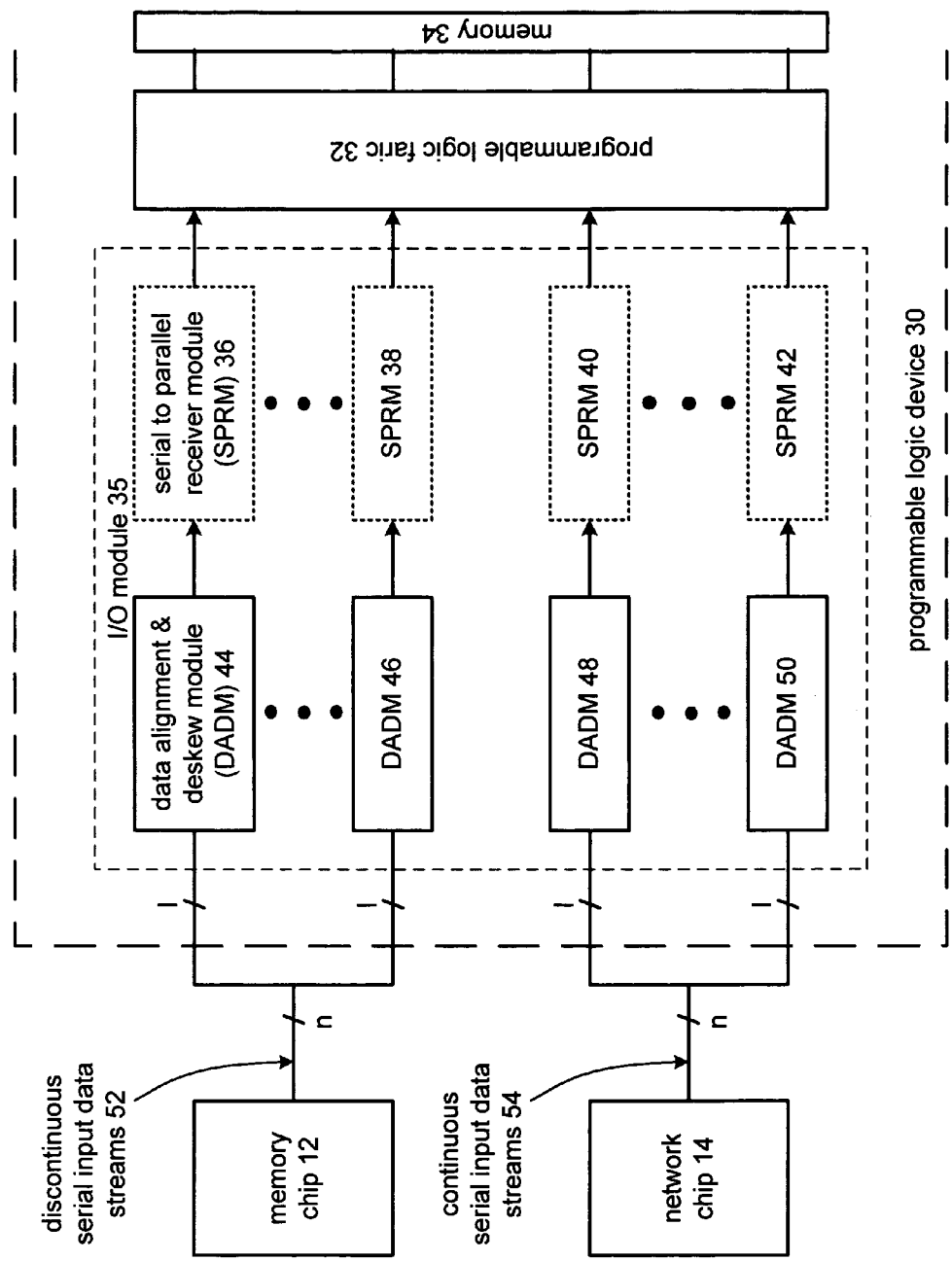
FIG. 3 is a schematic block diagram of integrated circuits communicating discontinuous and continuous serial data streams in accordance with the present invention.

FIG. 3 is a schematic block diagram of integrated circuits communicating discontinuous and continuous serial data streams. The integrated circuits may be included in system equipment components and/or end user devices. As shown, the integrated circuits include a programmable logic device 30, a memory chip 12, and a network chip 14. In other embodiments, other integrated circuits may be used in place of programmable logic device 30, memory chip 12, and network chip 14. In this illustration, the programmable logic device 30 receives discontinuous serial input data streams 52 from memory chip 12 and receives continuous serial input data streams 54 from the network chip 14. The serial input data streams 52 and 54 may include a plurality of serial data streams that are bonded together to increase the data rate. In other embodiments, input data streams 52 and 54 may each consist of a single data stream. As used herein, a data stream may be understood to mean any type of input signal, and may include, without limitation, data signals, clock signals, continuous data streams, discontinuous data streams, and any combination thereof.

The programmable logic device 30 includes an input/output (I/O) module 35, programmable logic fabric 32, and memory 34. The programmable logic device 30 may be a field programmable gate array, programmable logic array and/or any other type of programmable logic circuit. The input/output module 35 includes a plurality of data alignment and deskewing modules 44-50 and, in some embodiments, may optionally include a plurality of serial-to-parallel receiver modules 36-42 (shown in dotted boxes in the figure).

As shown, the data alignment and deskewing module 44 and 46 each receive a serial data stream that is one of the discontinuous serial input data streams 52 from memory chip 12. Data alignment and deskewing modules 48 and 50 each receive a serial data stream that is one of the continuous serial input data streams 54, from the network chip 14. Each of the data alignment and deskewing modules 44-50, which will be described in greater detail with reference to FIGS. 4-7, aligns its corresponding serial data stream for bonding and synchronizes its corresponding serial data stream with a local clock. The optional serial-to-parallel receiver modules 36-42 receive the aligned and deskewed serial data streams from the data alignment and deskew modules 44-50 and produce corresponding parallel data therefrom. The serial-to-parallel receiver modules 36-42 may include a data and clock recovery circuit, a serial-to-parallel module, and a physical coding sub-layer (PCS) module. The parallel data is then provided to another portion of the device, for example the programmable logic fabric 32, which may perform a stored function using the parallel data. In some embodiments, the serial output of the data alignment and deskewing modules 44-50 may be directly coupled to other portions of the device, such as the programmable logic fabric 32, for performing various functions on the serial data. Note that although FIG. 3 shows data alignment and deskewing modules 44-50 within an I/O module 35, in some embodiments, part or all of data alignment and deskewing modules 44-50 may be implemented in programmable logic fabric, such as programmable logic fabric 32.

Figure 4A:
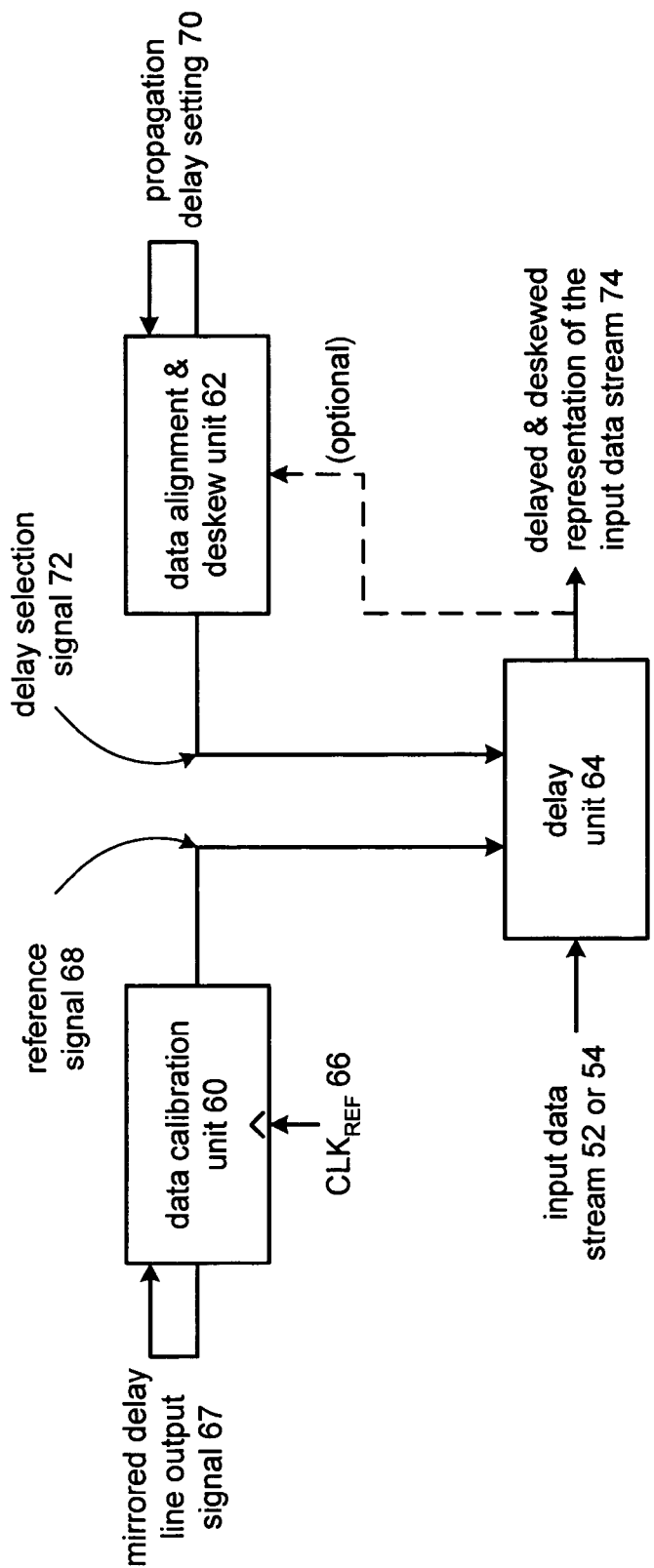
FIG. 4A is a schematic block diagram of a data alignment and deskew module in accordance with the present invention.

FIG. 4A is a schematic block diagram of the data alignment and deskewing module 44-50 that includes a data calibration unit 60, a data alignment and deskew unit 62, and a delay unit 64. The delay unit 64, which will be described in greater detail with reference to FIG. 6, receives the input data stream 52 or 54 and produces a delayed and deskewed representation of the input data stream 74 based on a reference signal 68 and a delay selection signal 72. Note that the output of the delay unit 64 is not fully delayed and deskewed until an appropriate delay selection signal 72 has been provided to the delay unit 64, which generally occurs some time after initial power up. The delay unit 64 uses the reference signal 68 to establish a period for an internal delay line. The delay unit 64 utilizes the delay selection signal 72 to select one of the plurality of delayed representations produced by the internal delay line to produce the delayed and deskewed representation of the input data stream 74. As noted earlier, part or all of the data alignment and deskewing modules may be implemented in programmable logic fabric. In one embodiment, the data calibration unit 60 and the delay unit 64 are implemented in dedicated circuits, and the data alignment and deskew unit 62 is implemented in programmable logic fabric, which advantageously allows the algorithms used in that unit to be updated or adjusted while in operation.

Figure 1:
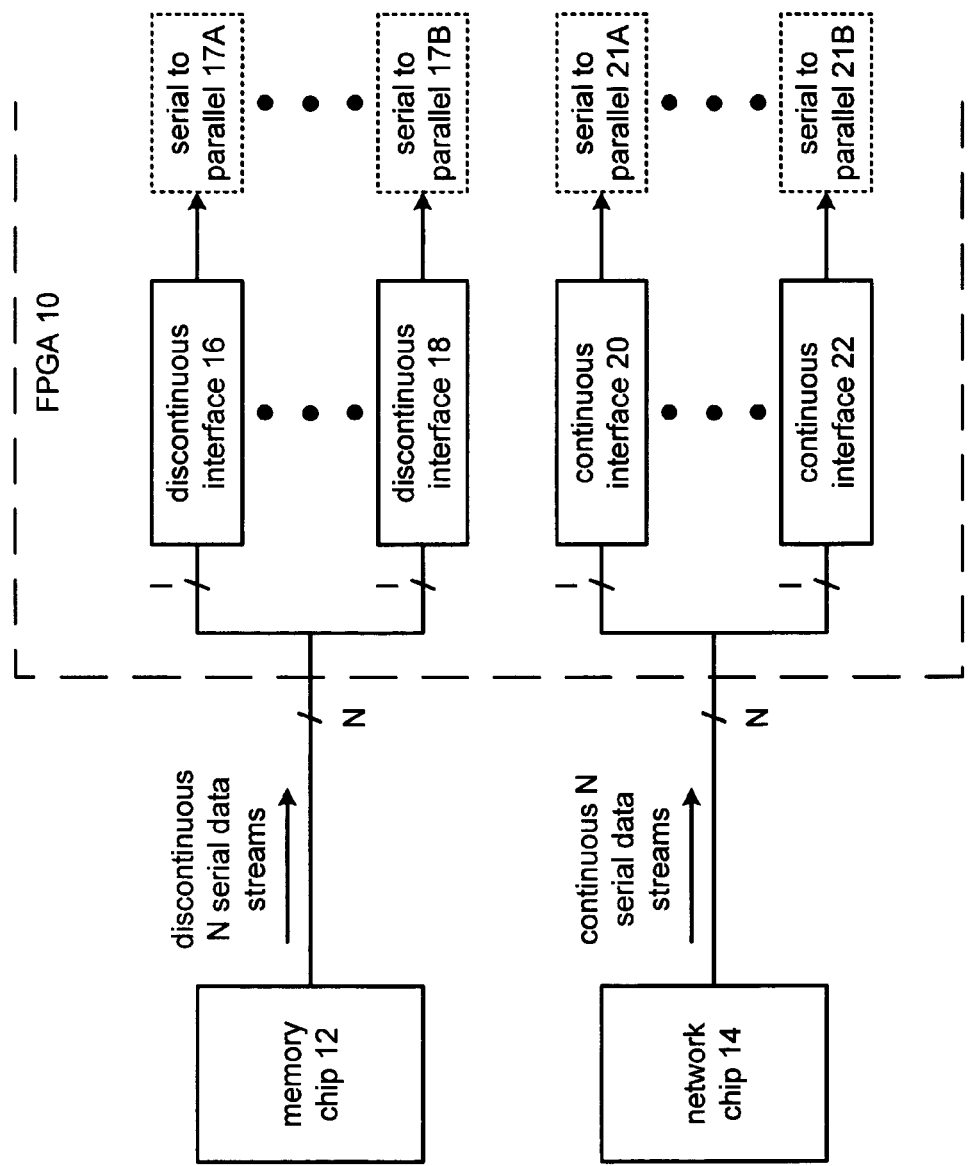
FIG. 1 is a schematic block diagram of integrated circuits communicating discontinuous and continuous serial data streams in accordance with the prior art.
Figure 2:
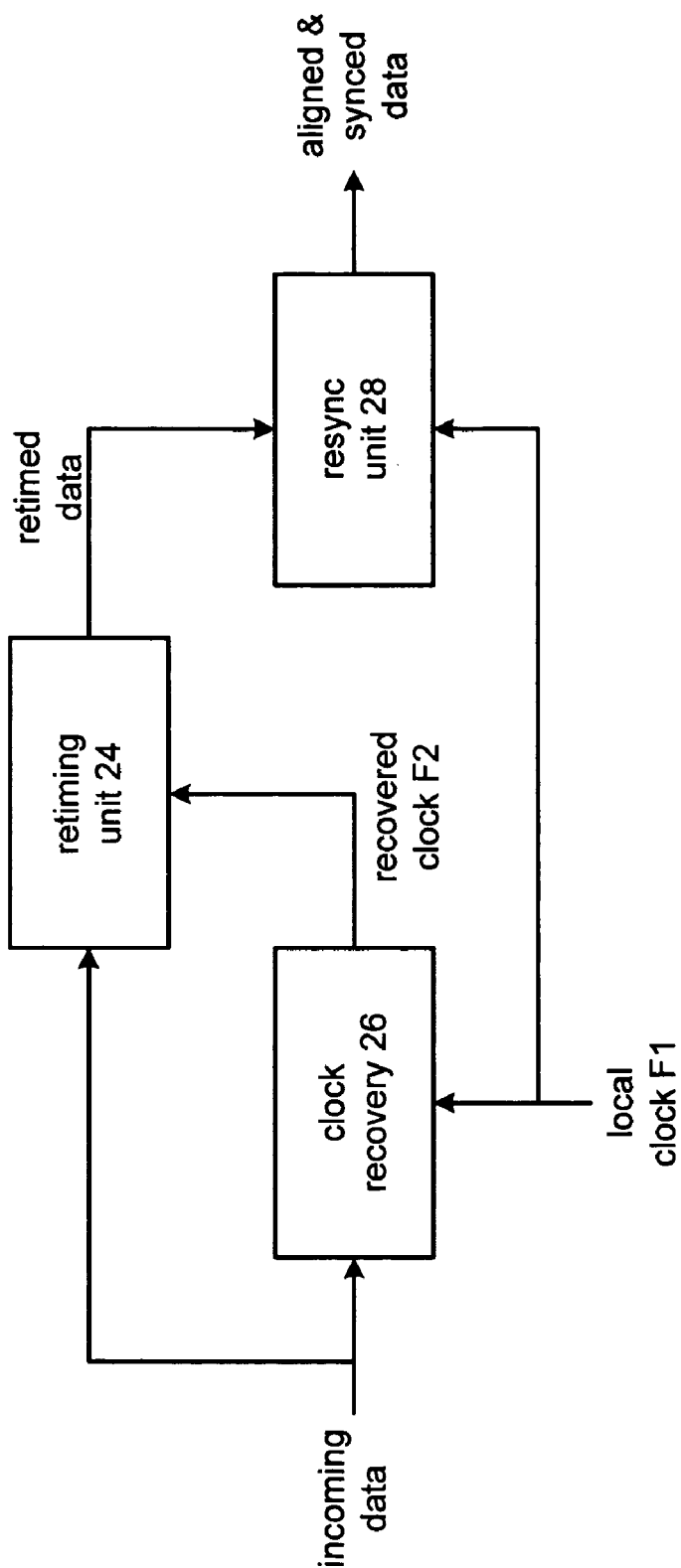
FIG. 2 is a schematic block diagram of a continuous interface in accordance with the prior art.

The calibration unit 60, which will be described in greater detail with reference to FIG. 5, produces the reference signal 68 from a reference clock 66 and a mirrored delay line output signal 67. The data calibration unit 60 includes a mirrored voltage delay line 80 that has a known relationship with respect to the delay line included in the delay unit 64. The data calibration unit 60 establishes the reference signal 68 such that the mirrored delay line output signal 67 is aligned with the clock reference 66 (e.g., delay line output signal 67 is a one period delayed representation of the clock reference 66). Note that the period of the reference clock is used as the basis for the delay reference generation and may have a large frequency range with no relationship to the frequency of the incoming data. Further note that an accurate reference clock source is not required, in comparison to the module of FIG. 2, since the delay is calibrated against the input frequency. Thus, the delay in the delay chain is less sensitive to process, temperature, and voltage variations. For example, in one embodiment, a clock source with +/−1,000 PPM can achieve a +/−0.1% delay accuracy.

The data alignment and deskew unit 62, which as noted above may be implemented within the programmable logic fabric of an FPGA, produces the delay selection signal 72 based on a propagation delay setting 70 and (optionally) the delayed and deskewed representation of the input data stream 74. Accordingly, the data alignment and deskew unit 62 is producing the delay selection signal 72 to compensate for and adjust propagation delays of the line carrying the input data stream 52 or 54 based on the particular application. In general, the alignment and deskewing unit 62 sequences through a plurality of settings for the delay selection signal 72 until the propagation delay of the line is substantially equal to the ideal delay. That is, the propagation delay is adjusted until the relative timing of the signal meets the requirements of the particular application.

In one embodiment, for example, the data alignment and deskew unit 62 may determine the delay selection signal 72 for use in an application having multiple serial lines bonded together to form a single communications channel. In such embodiments, the data alignment and deskew unit 62 may monitor at least one signal that is received via a line coupled to the data alignment and deskewing module 44-50 with respect to another line, which may be designated as the reference line. Note that the reference line may be one of the lines coupled to the DADM 44-50. That is, the alignment and deskewing unit 62 may adjust the timing of the delayed and deskewed representation of the input data stream 74 so that it is aligned, in time, (i.e., deskewed) with the delayed and deskewed representations of the input data stream carried on the designated reference line. In some cases, this may mean that delay on the line substantially matches the propagation delay of the reference line. In other cases, the delay may be offset from the propagation delay of the reference line by a predetermined amount. In some channel bonding applications, the delay may be adjusted by providing a special training pattern, a test signal, or alignment markers on one or more of the lines.

Figure 4B:
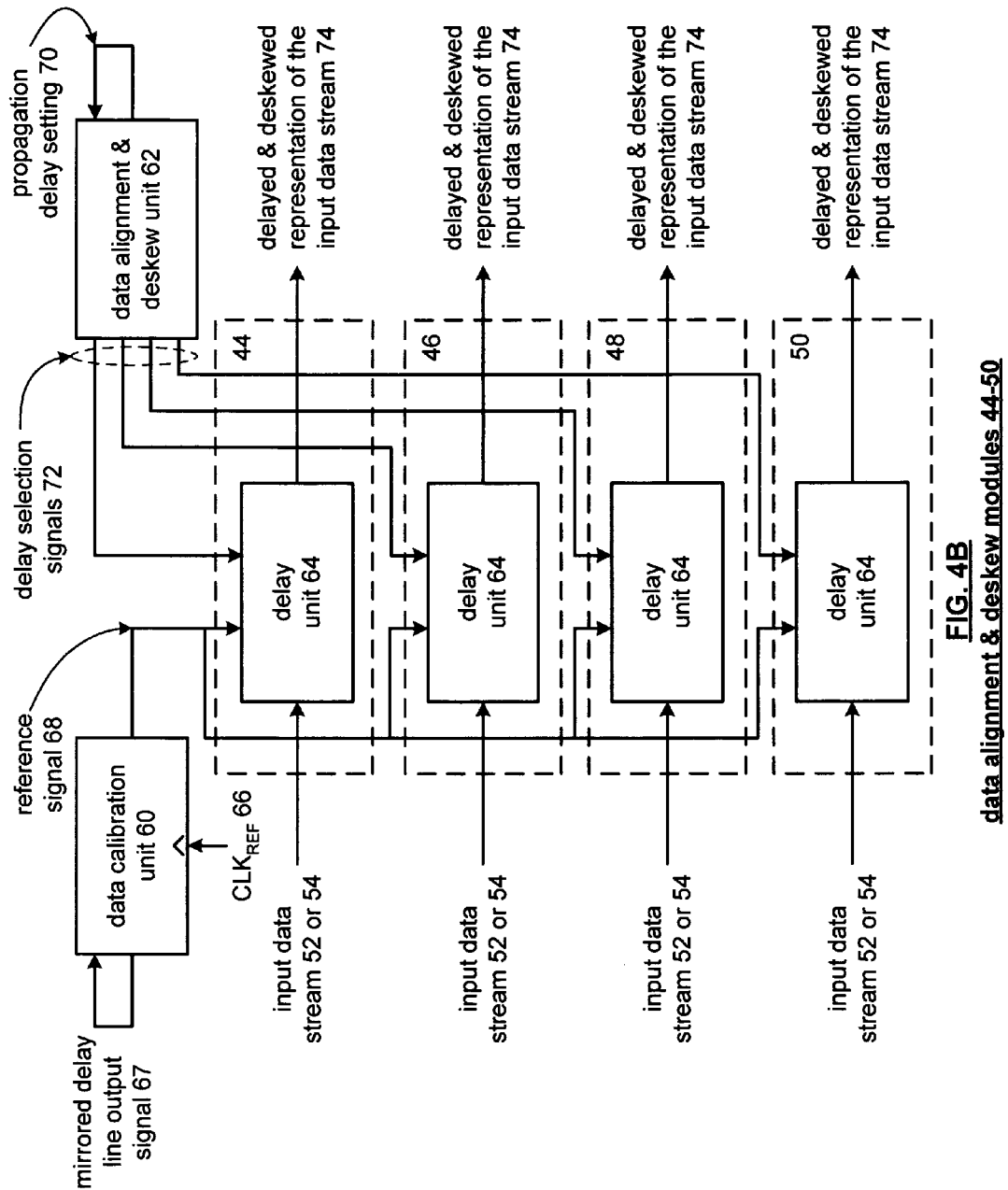
FIG. 4B is a schematic block diagram of data alignment and deskew modules in accordance with the present invention.

FIG. 4B shows an alternate embodiment of the data alignment & deskew modules 44-50, where one or more of the modules 44-50 may share a data calibration unit 60 and/or may share a data alignment & deskew unit 62. For example, in the embodiment shown, each of the data alignment & deskew modules 44-50 includes its own delay unit 64, but they all share one data calibration unit 60 and one data alignment & deskew unit 62. In this embodiment, the data calibration unit 60 provides the reference signal 68 to each of the delay units 64 and the data alignment & deskew unit 62 produces a set of delay selection signals 72 for providing a unique delay selection signal to each of the delay units 64. As one of average skill in the art will appreciate, numerous combinations of data calibration units 60, data alignment & deskew units 62, and delay units 64 may be implemented to achieve the desired aligning and deskewing of multiple lines of serial data.

Figure 5:
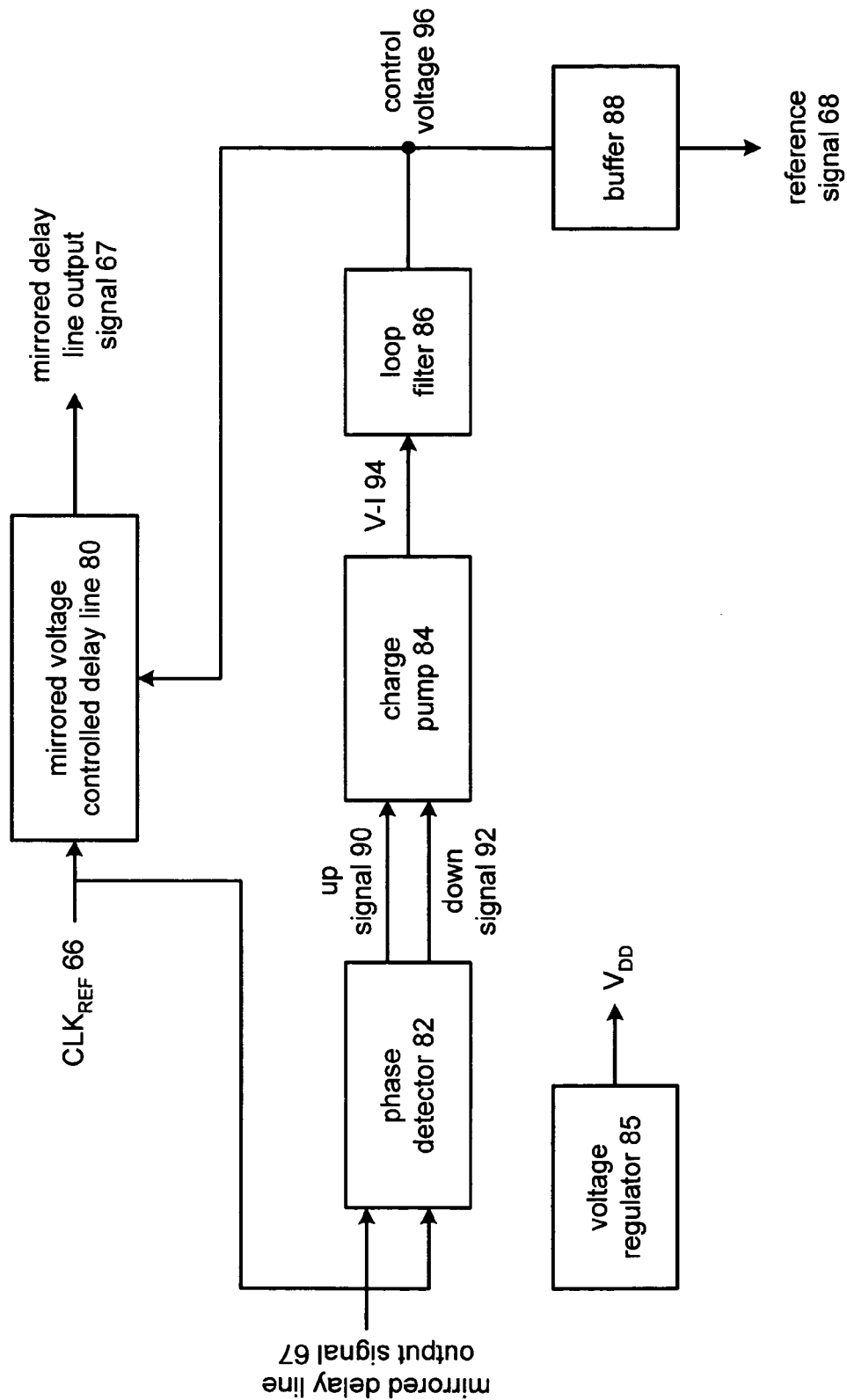
FIG. 5 is a schematic block diagram of a delay calibration unit in accordance with the present invention.

FIG. 5 is a schematic block diagram of the delay calibration unit 60 that includes a mirrored voltage controlled delay line 80, phase detector 82, charge pump 84, loop filter 86, buffer 88 and a voltage regulator 85. The voltage regulator 85 is operably coupled to produce a supply voltage that provides power to the mirrored voltage controlled delay line 80 and to the delay unit 64 such that the voltage to each delay line is substantially the same. In some embodiments, the voltage regulator 85 may be used to power other modules, such as the phase detector 82, the charge pump 84, and the loop filter 86.

The mirrored voltage controlled delay line 80 produces a plurality of representations of the clock reference signal 66 wherein the output of the mirrored voltage controlled delay line 80 is the mirrored delay line output signal 67. The phase detector 82, charge pump 84 and loop filter 86 function to maintain a one period delayed relationship between the mirrored delay line output signal 67 and the clock reference signal 66.

To achieve this relationship, the phase detector 82 compares the phases of the clock reference 66 and the mirrored delay line output signal 67 to produce an up signal 90 or a down signal 92. The phase detector 82 produces the up signal 90 when the phase of the mirrored delay line output signal 67 lags behind the clock reference 66 (i.e., the delay line is too slow) and produces the down signal 92 when the phase of the mirrored delay line output signal 67 leads the clock reference 66 (e.g., the mirrored delay control line 80 is too fast).

The charge pump 84 converts the up signal 90 and the down signal 92 into a positive and/or negative current 94. The loop filter 86 converts the current into a control voltage 96. The loop filter 86 provides the control voltage 96 to the mirrored voltage controlled delay line 80 to regulate the generation of the mirrored delay line output signal 67 and also provides the control voltage 96 to buffer 88. Buffer 88 mirrors the control voltage 96 to the delay unit 64 as the reference signal 68.

Figure 6:
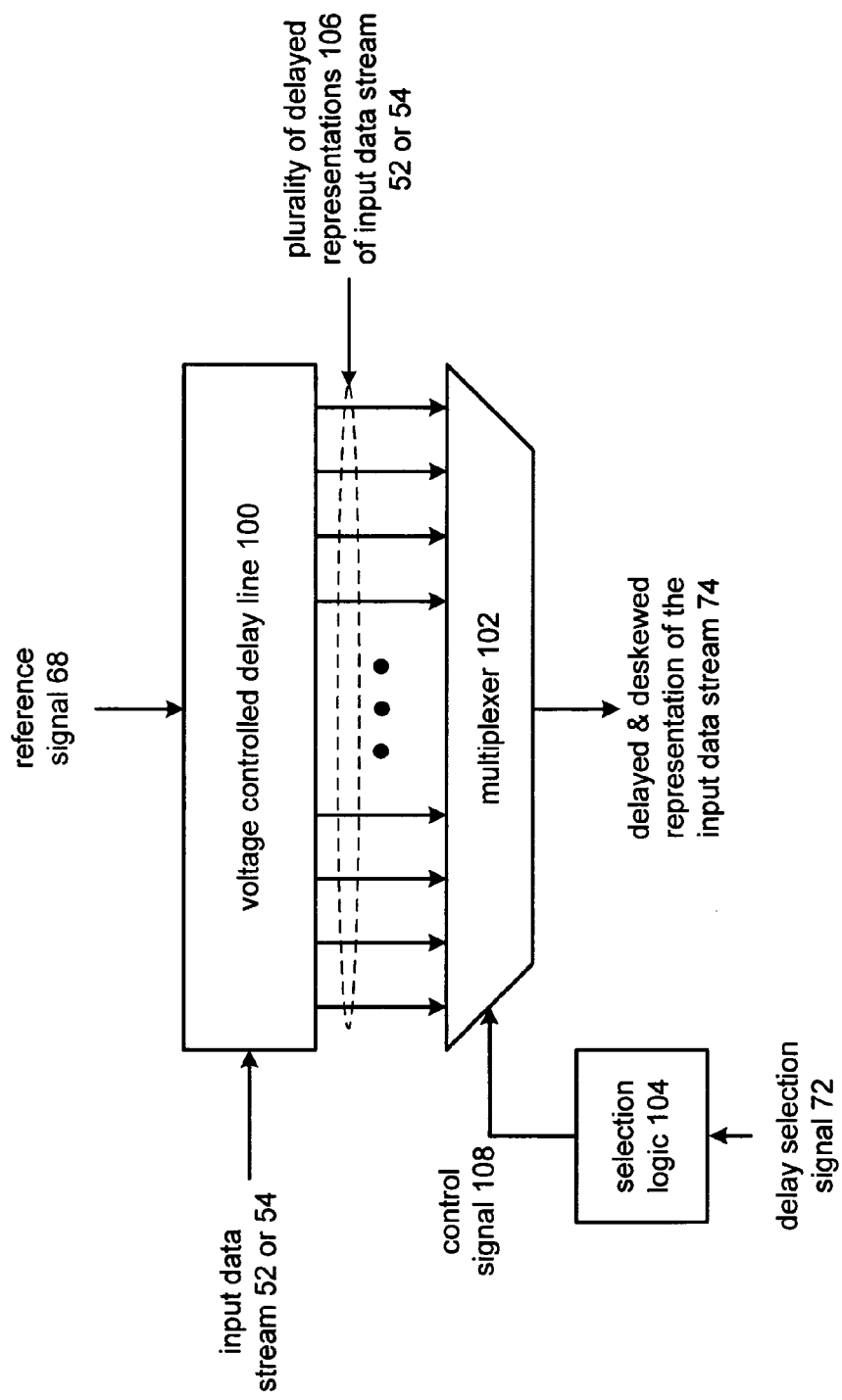
FIG. 6 is a schematic block diagram of a delay unit in accordance with the present invention.

FIG. 6 is a schematic block diagram of the delay unit 64 that includes a voltage controlled delay line 100, multiplexer 102 and selection logic 104. The voltage controlled delay line 100 is, in one embodiment, an identical delay line to the mirrored voltage controlled delay line 80 of the delay calibration unit 60 and/or a scaled representation thereof. By having this relationship between the delay lines 100 and 80, the delay lines are locked to the reference clock and, as such, the delay in each buffer of the respective delay lines is locked to the input clock (e.g., $CLK_{REF}$ 66 in FIG. 5). Further, if the same voltage is applied to identical delay lines, the delay in each delay line will be substantially identical.

The voltage controlled delay line 100 receives the input data stream as continuous or discontinuous data and produces a plurality of delayed representations 106 of the input data stream 52 or 54 based on the reference signal 68. The delay selection signal 72 causes the selection logic 104 to produce a control signal 108. Multiplexer 102 selects one of the plurality of delayed representations 106 of input data stream 52 or 54 from the voltage controlled delay line 100 based on control signal 108 to produce the delayed and deskewed representation of the input data stream 74. Note that in some embodiments, the delay unit 64 may include one or more delay buffers having an adjustable or controllable delay, thereby integrating the function of the voltage controlled delay line 100 and the multiplexer 102. For example, the adjustable delay buffer may provide a variable delay by adjusting a supply voltage or capacitive loading. The variable delay may be calibrated by the reference signal 68 and adjusted by the control signal 108. In other embodiments, other control signal schemes may be used. Other adjustable delay units are well-known to those of ordinary skill in the art and may also be used to provide delay unit 64.

Figure 7:
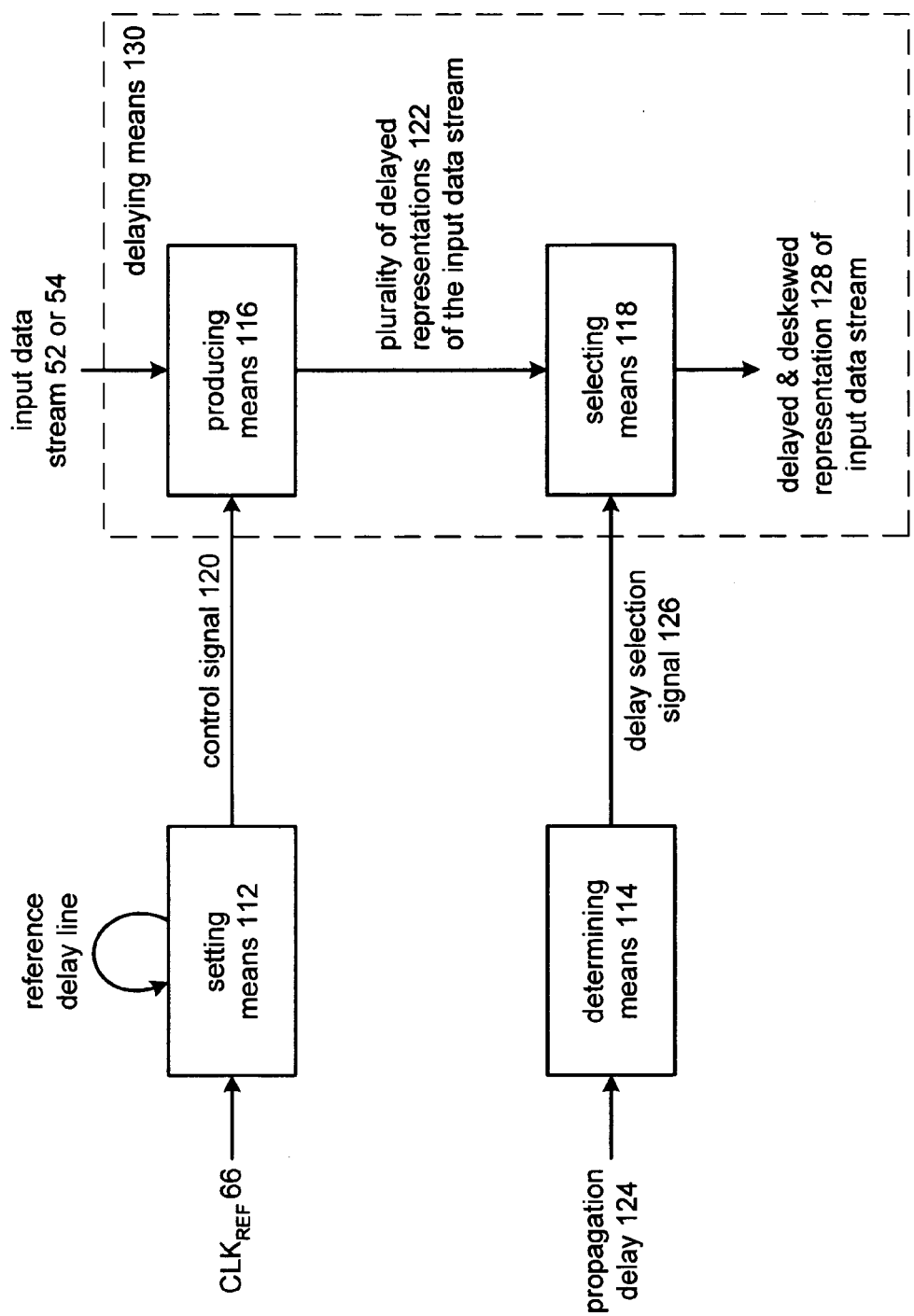
FIG. 7 is a schematic block diagram of an apparatus for aligning and deskewing data in accordance with the present invention.

FIG. 7 is a schematic of an apparatus 110 for aligning and deskewing an input data stream. The input data stream may be a continuous data stream and/or a discontinuous data stream. The apparatus 110 includes setting means 112, determining means 114, producing means 116 and selecting means 118. The means 112-118 may be a single device or a plurality of devices. A device may be a single processing device or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores information. Note that when a device implements one or more of its functions via a state machine, analog circuitry, digital circuitry, and/or logic circuitry, the corresponding operational instructions are embedded with the circuitry comprising the state machine, analog circuitry, digital circuitry, and/or logic circuitry.

The setting means 112 produces a control signal 120 based on a reference clock 66 and a reference delay line. The setting means functions to maintain a one period relationship, or other desired timing relationship, between the output of the reference delay line and the clock reference 66 via the control signal 120. In one embodiment, the setting means 112 produces the control signal 120 by aligning, in a closed loop manner, the reference controlled delay line with the reference clock to produce a reference control signal for the reference controlled delay line and equating the control signal to the reference control signal. Note that the reference clock may be adjustable such that per tap delays of the setting means 112 may be adjusted.

The producing means 116, which includes similar delaying circuitry to that of the setting means 112, produces a plurality of delayed representations 122 of the input data stream 52 or 54 based on the control signal 120. The determining means 114 produces a delay selection signal 126 based on propagation delay 124 of the line carrying the input data stream 52 or 54 and the requirements of the application. For example for channel bonding, the determining means 114 may determine the propagation delay 124 based on timing of receiving test signals or training patterns that are transmitted over the line with respect to the timing of receiving the test signals or training patterns transmitted over a reference line. In other applications, the determining means 114 may determine the delay selection signal 126 based on other factors. Alternatively, the determining means 114 may be a memory device that provides a stored value as the delay selection signal 126.

The selecting means 118 receives the plurality of delayed representations 122 of the input data stream 52 or 54 and outputs a delayed and deskewed representation 128 of the input data stream 52 or 54 based on the delayed selection signal 126. In this implementation, the accuracy of reference clock 66 is not as stringent as the clock reference of FIG. 2. For example, the reference clock 66 may have a + or −1,000 PPM and still achieve within the apparatus a + or −0.1% delay accuracy. Further, by adjusting the frequency of the reference clock 66, the delays produced by means 112 and 116 may be adjusted. Note that in some embodiments, the producing means 116 and the selecting means 118 may be integrated as a single delaying means 130. For example, the delaying means 130 may include one or more delay buffers having an adjustable or controllable delay.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, voltage variations, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a method and apparatus for producing an aligned and deskewed representation of continuous serial data streams and discontinuous data streams utilizing the same circuitry. As one of average skill in the art will appreciate, other embodiments may be derived from the teaching of the present invention without deviating from the scope of the claims.

What is claimed is:

1. A data alignment and deskewing module comprises:
   a delay calibration unit operably coupled to generate a reference signal based on a reference clock and a mirrored delay line output signal;
   a data alignment and deskew unit operably coupled to determine a delay selection signal based on a delayed and deskewed representation of an input data stream and propagation delay of a line on which the input data stream is received; and
   a delay unit operably coupled to produce the delayed and deskewed representation of the input data stream based on the reference signal and the delay selection signal,
   wherein the delay calibration unit comprises:
      a phase detector operably coupled to produce a phase signal based on a difference between phase of a reference clock and phase of the mirrored delay line output signal;
      a charge pump operably coupled to produce a current in response to the phase signal;
      a loop filter operably coupled to convert the current into a control voltage; and
      a mirrored voltage controlled delay line operably coupled to produce the mirrored delay line output signal based on the control voltage and the reference clock.

2. The data alignment and deskewing module of claim 1, wherein the data alignment and deskew unit functions to determine the delay selection signal by:
   sequencing through a plurality of delay selection signals until the propagation delay of the line substantially equals an ideal delay setting.

3. The data alignment and deskewing module of claim 1, wherein the data alignment and deskew unit functions to determine the delay selection signal by:
   monitoring at least one of a test signal, a training pattern and an alignment marker received via the line with reference to the at least one of the test signal, the training pattern and the alignment marker being received via a reference transmission line; and sequencing through a plurality of delay selection signals until the propagation delay of the line substantially matches the propagation delay of the reference transmission line.

4. The data alignment and deskewing module of claim 1, wherein the delay calibration unit further comprises:
a buffer operably coupled to provide the control voltage as the delay reference signal.

5. The data alignment and deskewing module of claim 1, wherein:
the phase signal comprises an up signal or a down signal;
the charge pump is operably coupled to produce a positive current in response to the up signal and a negative current in response to the down signal; and
the loop filter is operably coupled to convert the positive current and the negative current into a control voltage.

6. The data alignment and deskewing module of claim 1 further comprises:
a voltage regulator operably coupled to produce a supply voltage that is provided to power the delay unit and the voltage controlled delay line.

7. The data alignment and deskewing module of claim 1, wherein the delay unit comprises:
a voltage controlled delay line operably coupled to produce a plurality of delayed representations of the input data stream from the input data stream based on the delay reference signal; and
multiplexer operably coupled to output one of the plurality of delayed representations of the input data stream as the delayed and deskewed representation of the input data stream based on the delay selection signal.

8. The data alignment and deskewing module of claim 7, wherein the delay unit further comprises:
selection logic operably coupled to interpret the delay selection signal to produce a control signal, wherein the control signal is provided to the multiplexer.

9. The data alignment and deskewing module of claim 1, wherein the delay unit comprises:
a delay buffer having an adjustable delay operably coupled to produce the delayed and deskewed representation of the input data stream based on at least one of the delay reference signal and the delay selection signal.

10. The data alignment and deskewing module of claim 1, wherein the input data stream comprises:
a continuous data stream; or
a discontinuous data.

11. A integrated circuit comprises:
an input/output (I/O) section;
a memory section;
a programmable logic fabric section operably coupled to the I/O section and to the memory section, wherein the I/O section includes a plurality of data alignment and deskewing modules, wherein each of the plurality of data alignment and deskewing modules is operably coupled to receive a corresponding input data stream, wherein at least some of the corresponding input data streams are bonded, wherein the plurality of data alignment and deskewing modules processing the at least some of the corresponding input data streams that are bonded include:
at least one delay calibration unit operably coupled to generate a reference signal based on a reference clock and a mirrored delay line output signal;
at least one data alignment and deskew unit operably coupled to determine at least one delay selection signal based on a propagation delay setting that corresponds to propagation delay of lines on which the at least some of the corresponding input data streams are received; and
a plurality of delay units operably coupled to produce the delayed and deskewed representations of the corresponding input data stream based on the reference signal and the at least one delay selection signal.

12. The integrated circuit of claim 11, wherein the at least one data alignment and deskew unit functions to determine the delay selection signal by:
monitoring at least one of a test signal, a training pattern and an alignment marker received via the line on which the corresponding input data stream is received;
sequencing through a plurality of delay selection signals until the propagation delay of the line on which the corresponding input data stream is received substantially matches the propagation delay of a reference line receiving the at least one of the test signal, the training pattern and the alignment marker to produce a corresponding delay selection signal; and
selecting one of the corresponding delay selection signals produced by the data alignment and deskewing modules processing the at least some of the corresponding input data streams that are aligned to produce the delay selection signal, wherein the selecting is based on the propagation delay of the lines on which the at least some of the corresponding input data streams are received.

13. The integrated circuit of claim 11, wherein the at least one data alignment and deskew unit functions to determine the delay selection signal by:
sequencing through a plurality of delay selection signals until the propagation delay of the line on which the corresponding input data stream is received is substantially equal to an ideal delay setting to produce a corresponding delay selection signal; and
selecting one of the corresponding delay selection signals produced by the data alignment and deskewing modules processing the at least some of the corresponding input data streams that are aligned to produce the delay selection signal, wherein the selecting is based on the propagation delay of the lines on which the at least some of the corresponding input data streams are received.

14. The integrated circuit of claim 11, wherein the at least one delay calibration unit comprises:
a phase detector operably coupled to produce a phase signal based on a difference between phase of a reference clock and phase of the mirrored delay line output signal;
charge pump operably coupled to produce a current in response to the phase signal;
loop filter operably coupled to convert the current into a control voltage; and
a mirrored voltage controlled delay line operably coupled to produce the mirrored delay line output signal based on the control voltage and the reference clock.

15. The integrated circuit of claim 14, wherein the at least one delay calibration unit further comprises:
a buffer operably coupled to provide the control voltage as the delay reference signal.

16. The integrated circuit of claim 14, wherein:
the phase signal comprises an up signal or a down signal;
the charge pump is operably coupled to produce a positive current in response to the up signal and a negative current in response to the down signal; and
the loop filter is operably coupled to convert the positive current and the negative current into a control voltage.

17. The integrated circuit of claim 14, wherein the at least one delay calibration unit further comprises:

a voltage regulator operably coupled to produce a supply voltage that is provided to power the delay unit and the voltage controlled delay line.

18. The integrated circuit of claim 14, wherein each of the plurality of delay units comprises:
a voltage controlled delay line operably coupled to produce a plurality of delayed representations of the corresponding input data stream from the corresponding input data stream based on the delay reference signal; and
multiplexer operably coupled to output one of the plurality of delayed representations of the corresponding input data stream as the delayed and deskewed representation of the corresponding input data stream based on the delay selection signal.

19. The integrated circuit of claim 18, wherein each of the plurality of delay units further comprises:
selection logic operably coupled to interpret the delay selection signal to produce a control signal, wherein the control signal is provided to the multiplexer.

20. The integrated circuit of claim 14, wherein each of the plurality of delay units comprises:
a delay buffer having an adjustable delay operably coupled to produce the delayed and deskewed representation of the corresponding input data stream based on at least one of the delay reference signal and the delay selection signal.

21. The integrated circuit of claim 11, wherein each of the corresponding input data streams comprises:
a continuous data stream; or
a discontinuous data stream.

22. The integrated circuit of claim 11, wherein the integrated circuit comprises a programmable logic device.

23. A data alignment and deskewing module comprises:
a delay calibration unit operably coupled to generate a reference signal based on a reference clock and a mirrored delay line output signal;
a data alignment and deskew unit operably coupled to determine a delay selection signal based on a delayed and deskewed representation of an input data stream and propagation delay of a line on which the input data stream is received; and
a delay unit operably coupled to produce the delayed and deskewed representation of the input data stream based on the reference signal and the delay selection signal,
wherein the data alignment and deskew unit functions to determine the delay selection signal by:
monitoring at least one of a test signal, a training pattern and an alignment marker received via the line with reference to the at least one of the test signal, the training pattern and the alignment marker being received via a reference transmission line; and
sequencing through a plurality of delay selection signals until the propagation delay of the line substantially matches the propagation delay of the reference transmission line.

24. The data alignment and deskewing module of claim 23, wherein the delay calibration unit comprises:
a phase detector operably coupled to produce a phase signal based on a difference between phase of a reference clock and phase of the mirrored delay line output signal;
a charge pump operably coupled to produce a current in response to the phase signal;
a loop filter operably coupled to convert the current into a control voltage; and
a mirrored voltage controlled delay line operably coupled to produce the mirrored delay line output signal based on the control voltage and the reference clock.

25. The data alignment and deskewing module of claim 24, wherein the delay calibration unit further comprises:
a buffer operably coupled to provide the control voltage as the delay reference signal.

26. The data alignment and deskewing module of claim 24, wherein:
the phase signal comprises an up signal or a down signal;
the charge pump is operably coupled to produce a positive current in response to the up signal and a negative current in response to the down signal; and
the loop filter is operably coupled to convert the positive current and the negative current into a control voltage.

27. The data alignment and deskewing module of claim 24 further comprises:
a voltage regulator operably coupled to produce a supply voltage that is provided to power the delay unit and the voltage controlled delay line.

28. The data alignment and deskewing module of claim 24, wherein the delay unit comprises:
a voltage controlled delay line operably coupled to produce a plurality of delayed representations of the input data stream from the input data stream based on the delay reference signal; and
multiplexer operably coupled to output one of the plurality of delayed representations of the input data stream as the delayed and deskewed representation of the input data stream based on the delay selection signal.

29. The data alignment and deskewing module of claim 28, wherein the delay unit further comprises:
selection logic operably coupled to interpret the delay selection signal to produce a control signal, wherein the control signal is provided to the multiplexer.

30. The data alignment and deskewing module of claim 24, wherein the delay unit comprises:
a delay buffer having an adjustable delay operably coupled to produce the delayed and deskewed representation of the input data stream based on at least one of the delay reference signal and the delay selection signal.

31. The data alignment and deskewing module of claim 23, wherein the input data stream comprises:
a continuous data stream; or
a discontinuous data.

* * * * *